(12) United States Patent
Olson et al.

(10) Patent No.: US 12,505,134 B2
(45) Date of Patent: Dec. 23, 2025

(54) LARGE LANGUAGE MODEL ARCHITECTURE TO LEVERAGE PUBLIC AND PRIVATE DATA

(71) Applicant: Microsoft Technology Licensing, LLC, Redmond, WA (US)

(72) Inventors: Jamie Olson, Kansas City, MO (US); Wenjin Xu, Bothell, WA (US); Frederick Qin, Duvall, WA (US); Qiwen Guo, Redmond, WA (US); Li Li, Maple Value, WA (US); Rui Min, Bellevue, WA (US); Bing Li, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 174 days.

(21) Appl. No.: 18/405,168

(22) Filed: Jan. 5, 2024

(65) Prior Publication Data

US 2025/0225163 A1      Jul. 10, 2025

(51) Int. Cl.
*G06F 40/00* (2020.01)
*G06F 16/3332* (2025.01)
(Continued)

(52) U.S. Cl.
CPC ........ *G06F 16/3338* (2019.01); *G06F 16/955* (2019.01); *G06F 40/30* (2020.01); *G06F 40/40* (2020.01)

(58) Field of Classification Search
CPC ...... G06F 16/345; G06F 16/383; G06F 16/93; G06F 40/40; G06F 40/58; G06F 40/56; G06F 40/20; G06F 40/253; G06F 40/263; G06F 40/268; G06F 40/274; G06F 40/284; G06F 40/279; G06F 40/289;
(Continued)

(56) References Cited

U.S. PATENT DOCUMENTS 9,299,342 B2 *   3/2016   Chang ............... G06F 16/24575
10,885,125 B2 *  1/2021   Panuganty ............ G06F 16/951
(Continued)

OTHER PUBLICATIONS

Ng, Y., Miyashita, D., Hoshi, Y., Morioka, Y., Torii, O., Kodama, T., & Deguchi, J. (2023). Simplyretrieve: A private and lightweight retrieval-centric generative ai tool. arXiv preprint arXiv:2308.03983 (Year: 2023).*

*Primary Examiner* — Edgar X Guerra-Erazo
(74) *Attorney, Agent, or Firm* — Cantor Colburn LLP; Sean Seung Kyu Kim (57) ABSTRACT

Aspects of the disclosure include methods and systems for an intelligent chat powered by a large language model that leverages both public and private data to answer user questions. An exemplary method includes receiving a user query including natural language input from a user and executing the user query against at least one public data source and at least one private data source. Queries executed against a public source are retrieved using public search indices and queries executed against a private data source are retrieved using user credentials. A query rewrite and a query context including the user query and retrieved information from the public and private data sources are input to a large language model. A response is received from the large language model that includes a natural language answer to the user query and a link to the retrieved information.

20 Claims, 4 Drawing Sheets

(51) Int. Cl.
*G06F 16/955* (2019.01)
*G06F 40/30* (2020.01)
*G06F 40/40* (2020.01)

(58) Field of Classification Search
CPC ........ G06F 40/295; G06F 40/35; G06F 40/30;
G06F 40/00; G06F 40/10; G06F 40/166;
G06F 40/216; G06F 40/205; G06F
40/226; G06F 40/242; G06F 40/247;
G06F 40/237; G06N 3/02; G06N 3/04;
G06N 3/042; G06N 3/043; G06N 3/044;
G06N 3/0442; G06N 3/045; G06N
3/0455; G06N 3/0464; G06N 3/047;
G06N 3/0475; G06N 3/048; G06N
3/0499; G06N 3/08; G06N 3/082; G06N
3/084; G06N 3/088; G06N 3/0895; G06N
3/09; G06N 3/091; G06N 3/092; G06N
3/094; G06N 3/096; G06N 3/098; G06N
3/0985; G06N 20/00; G06N 20/10; G06N
20/20

See application file for complete search history.

(56) References Cited

U.S. PATENT DOCUMENTS

| | | | |
|---|---|---|---|
| 2024/0184834 A1* | 6/2024 | McCann | G06N 3/0475 |
| 2024/0290327 A1* | 8/2024 | Byrne | G06F 3/167 |
| 2024/0403341 A1* | 12/2024 | Berglund | G06F 16/3326 |
| 2025/0068665 A1* | 2/2025 | Chandel | G06F 16/3347 |

* cited by examiner

LARGE LANGUAGE MODEL ARCHITECTURE TO LEVERAGE PUBLIC AND PRIVATE DATA

INTRODUCTION

The subject disclosure relates to online search, search queries, and large language models, and particularly to an intelligent chat powered by a large language model to leverage both public and private data to respond to user questions.

A user search query, often referred to simply as a "search query," is an expression that a user enters into a search engine when seeking information, answers, products, or services. A search query is the specific phrase and/or keywords that users use to articulate their information needs and to initiate a search process. For example, a search query can include a textual expression entered into a search bar, a verbal expression spoken to the search engine, and/or a combination of textual and verbal input. Search queries can vary widely in length and complexity, ranging from simple single-word queries like "weather" to more specific and complex queries like "best smartphones under $500 with good camera quality."

When a user provides a search query to a search engine, usually via a user interface, the search engine's algorithms process the search query and retrieve relevant results that best match the user's search intent. Often, search results include a list of web page links (Uniform Resource Locators or URLs) displayed on a search engine results page (SERP), and the user can browse through and select one or more of the provided links to be directed to an underlying resource (e.g., a webpage) of interest.

Many search engines rely upon a pre-populated URL index, also referred to as a "search index" or "web index," to ensure the retrieval of the most relevant results for a search query. A search index is a large database maintained by (or accessible to) a search engine that contains information about a variety of web pages and their content. The search index serves as a sort of ranked catalog of web pages that have been crawled, analyzed, and indexed by the search engine's web crawlers. The search index contains key information about each indexed page, such as the web page's URL, content (textual data, graphical data, audio data, etc.), metadata, language, location relevance, and other relevant metadata.

When a user enters a search query into a search engine, the search engine can poll (query) the search index to retrieve one or more indexed web pages and/or web page links that match the user's search intent. For example, the search index can be queried to find web pages that contain keyword(s) and context related to the user's query. In some implementations, the search engine will list the retrieved web page links in the SERP by order of their indexed position in the search index. In some implementations, the search engine can return the retrieved web page links in an order which considers the query itself, the relevance of the results, and the respective ranks in the search index.

SUMMARY

Embodiments of the present invention are directed to methods for providing an intelligent chat. A non-limiting example method includes receiving a user query including natural language input from a user and executing the user query against at least one public data source and at least one private data source. Queries executed against a public source are retrieved using public search indices and queries executed against a private source are retrieved using user credentials. A query rewrite and a query context including the user query and retrieved information from the public and private data sources are input to a large language model. A response is received from the large language model that includes a natural language answer to the user query.

Embodiments of the present invention are directed to systems for providing an intelligent chat. A non-limiting example system includes a memory having computer readable instructions and one or more processors for executing the computer readable instructions. The computer readable instructions control the one or more processors to perform various operations. The operations include receiving, at a large language model, a user query including natural language input and a query context including the user query and retrieved information from at least one document of one or more candidate public documents and one or more candidate private documents. The operations include generating, by the large language model, a query rewrite by transforming the user query and generating, by the large language model, a response to the user query, the response including a natural language answer and a link to the retrieved information.

Another non-limiting example system includes a memory having computer readable instructions and one or more processors for executing the computer readable instructions. The computer readable instructions control the one or more processors to perform various operations. The operations include receiving, from a client by a large language model, a user query including natural language input from a user and credentials of the user. The operations include executing, by the large language model, the user query against at least one public data source using one or more public search indices to identify a public document and executing, by the large language model, the user query against at least one private data source using the credentials of the user to access the at least one private data source to identify a private document. The operations include providing, by the large language model to the client, a response including a natural language answer to the user query that leverages at least one of the public document and the private document.

The above features and advantages, and other features and advantages of the disclosure are readily apparent from the following detailed description when taken in connection with the accompanying drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified.

In the accompanying figures and following detailed description of the described embodiments of the invention, the various elements illustrated in the figures are provided with two or three-digit reference numbers. With minor exceptions, the leftmost digit(s) of each reference number corresponds to the figure in which its element is first illustrated.

DETAILED DESCRIPTION

The search index is the backbone of a search engine's ability to deliver accurate and relevant search results to users. For a public search, when a user enters a search query into a search engine, the search engine can poll (query) the search index to retrieve one or more indexed web page links that match the user's search intent. The search engine can then list the retrieved web page links in a search engine results page (SERP). To ensure accurate search results, the search engine's algorithms can be designed to identify one or more relevant web pages in the search index that contain content and metadata (stored in the search index with the respective web page) matching the search query's keyword(s) and/or context.

Search indices are usually populated with a large number of web page links (often millions or even billions of links) using a process known as crawling (or "web crawling"). In an example, crawling involves the systematic exploration of the web (or more formally, the "Internet") by automated programs known as web crawlers, spiders, and/or search engine bots. The primary goal of crawling is to discover web pages, gather their Uniform Resource Locator (URL) and content, and prepare them for indexing in a search index.

Unfortunately, many sources that might be relevant to a user's search query are not natively accessible to web crawlers and such sources might not be found in public search indices. In particular, private data, such as workplace data, can be gated behind authentication processes outside the scope of these types of public data retrieval systems. Complicating matters further, the amount of private and public data continues to increase exponentially, making it difficult to find a particular piece of information using even well-crafted queries. In many cases, it can be difficult for users to even identify a given query as answerable using public vs. private data. As a result, a user can become frustrated with poor search results, especially when data known to exist is not returned in a query response.

This disclosure introduces an intelligent chat system powered by a large language model to leverage both public and private data to answer user questions (in an example, referred to herein as user queries). Rather than limiting answers to publicly available information, aspects of the present disclosure seamlessly integrate public and private data sources, based on the user's authentication and/or credentials, into a single cohesive search experience. In some embodiments, a large language model is trained to provide a natural language answer to the user that contains information found within the retrieved public and private data sources (sometimes described herein as the "Documents" or "documents"), instead of simply a list of those sources that might contain the desired information. In some embodiments, the relevant sources for building the natural language answer can be extracted and provided as a link alongside the natural language answer for easy verification. In some embodiments, to improve the quality of the natural language answer, a user query is rewritten into searchable text and supplemented with context gleaned from the retrieved public and private data sources prior to being input to the large language model.

Powering a search experience with both public and private data as described herein solves a number of somewhat related technical issues with current search (e.g., query-and-response) systems. In particular, current search solutions simply do not leverage a user's access to private data when constructing responses to a respective user's queries. In addition, conventional search engines are largely configured to return a SERP having a list of retrieved web page links and it is up to the user to investigate those potentially relevant sources in a self-directed manner to find the information of interest. In contrast, the intelligent chat system described herein builds a natural language answer from both public and private data and only provides a link to the underlying data for verification. The result is a much more efficient and pleasant search experience.

Figure 1:
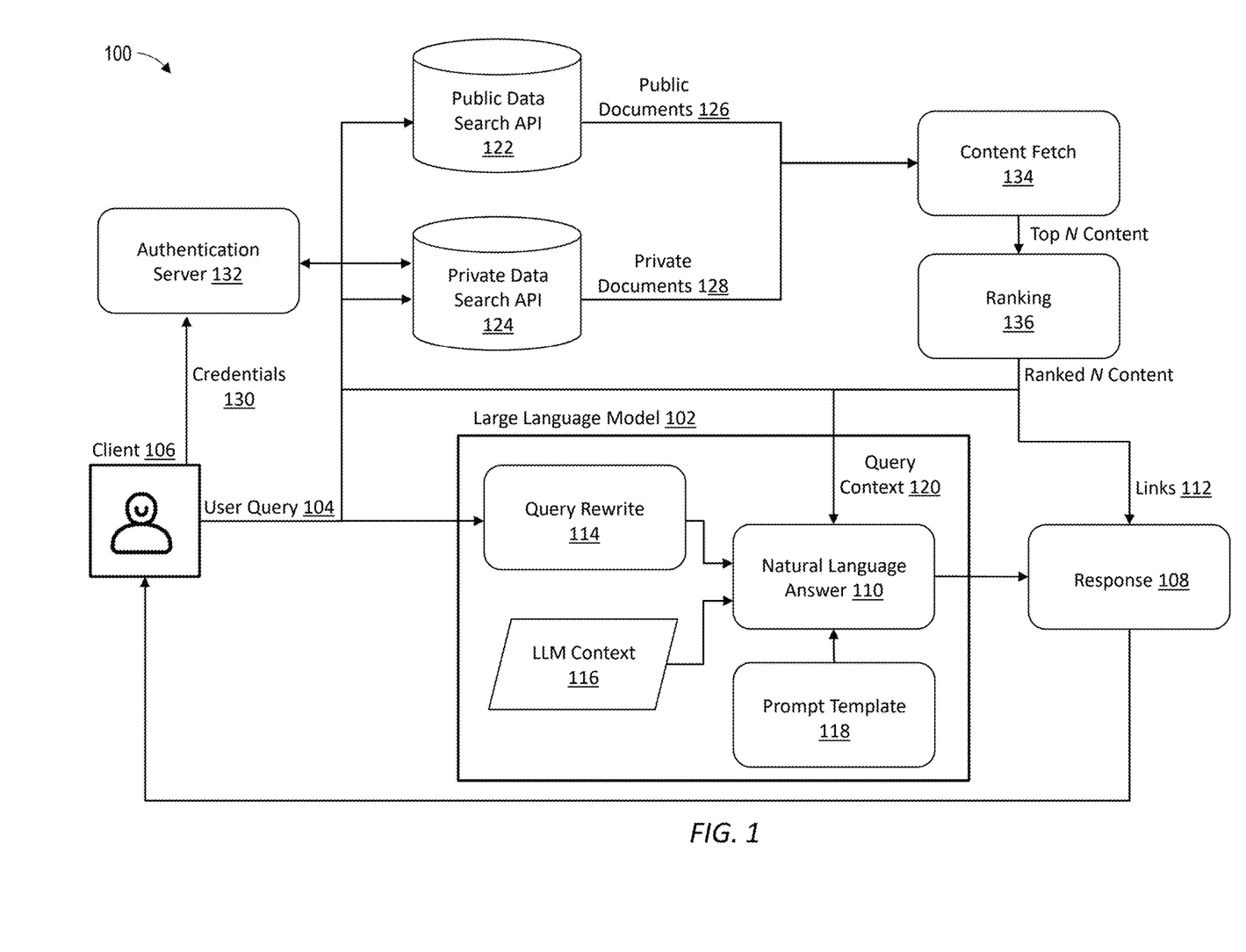
FIG. 1 depicts a block diagram for an intelligent chat system in accordance with one or more embodiments.

FIG. 1 depicts a block diagram 100 for an intelligent chat system configured in accordance with one or more embodiments of the present invention. As shown in FIG. 1, a large language model 102 receives a user query 104 from a user (here, "client 106") and, in response, provides a response 108. In some embodiments, the user query 104 includes a natural language user input, such as a string of text. For example, the user query 104 can include the phrase "Who is John Smith and what is their work phone number?".

While not meant to be particularly limited, the large language model 102 can include a neural network machine learning architecture that is capable of processing large amounts of text data and generating high-quality natural language responses. In practice, large language models have been used for a wide range of natural language processing (NLP) tasks, including, for example, machine translation, text generation, sentiment analysis, and question answering (i.e., query-and-response). Large language models have also been adapted for other domains, such as computer vision, speech recognition, and software development.

At its core, a large language model consists of an encoder and a decoder. The encoder takes in a sequence of input tokens, such as words or characters, and produces a sequence of hidden representations for each token that capture the contextual information of the input sequence. The decoder then uses these hidden representations, along with a sequence of target tokens, to generate a sequence of output tokens.

The most popular and widely used types of large language models are recurrent neural networks (RNNs) and transformers. RNNs are neural networks that process sequences of inputs one by one, and use a hidden state to remember previous inputs. RNNs are particularly well-suited for tasks that involve sequential data, such as text, audio, and time-series data. In a transformer, on the other hand, the encoder and decoder are composed of multiple layers of multi-headed self-attention and feedforward neural networks. The core of the transformer model is the self-attention mechanism, which allows the model to focus on different parts of an input sequence at different timesteps, without the need for recurrent connections that process the sequence one by one. Transformers leverage self-attention to compute representations of input sequences in a parallel and context-aware manner and are well-suited to tasks that require capturing long-range dependencies between words in a sentence, such as in language modeling and machine translation.

Large language models are typically trained on large amounts of text data, often containing hundreds of millions if not billions of words. To handle the large amount of data, the training process is often highly parallelized. The training process can take several days or even weeks, depending on the size of the model and the amount of training data involved. Large language models can be trained using backpropagation and gradient descent, with the objective of minimizing a loss function such as cross-entropy loss.

Figure 2:
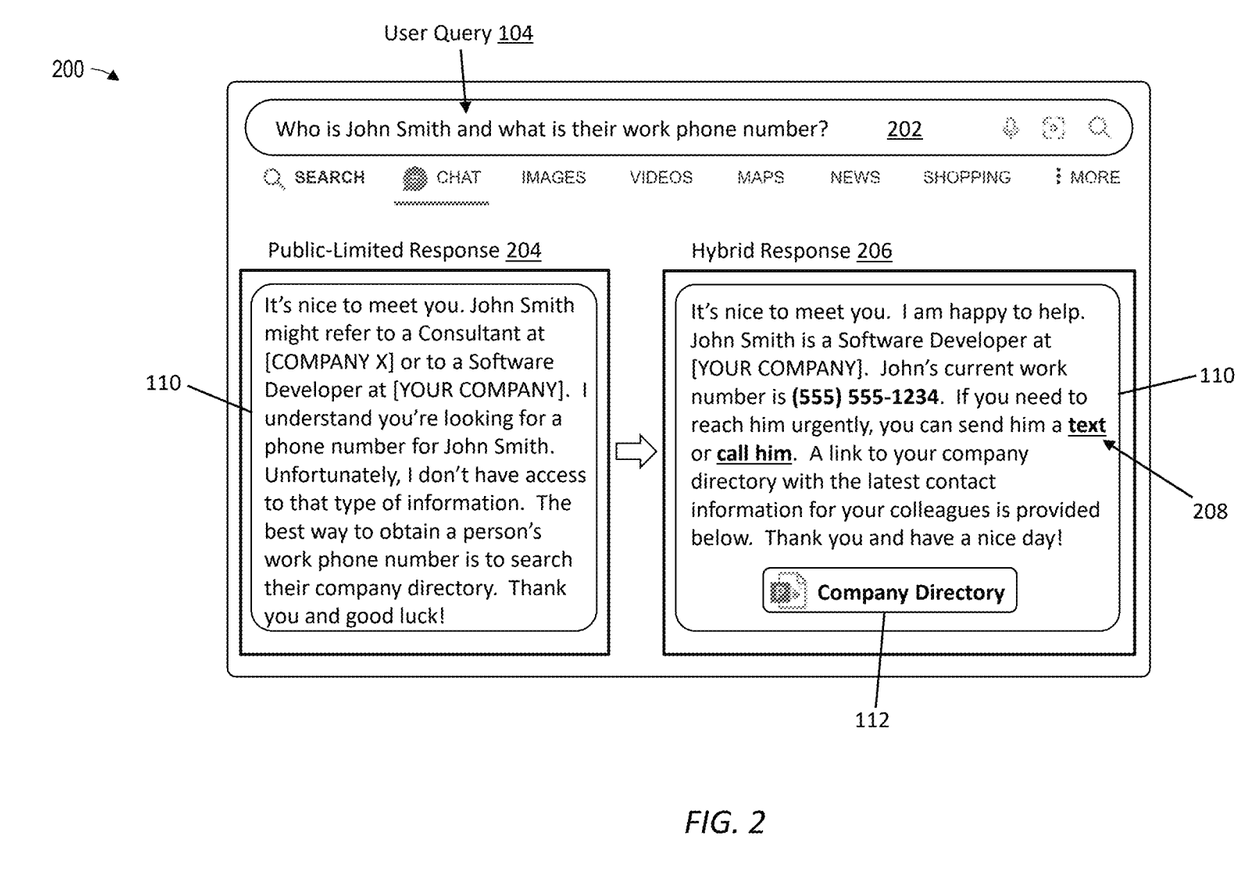
FIG. 2 depicts an example search engine results page of an intelligent chat system in accordance with one or more embodiments.

In some embodiments, the response 108 includes a combination of a natural language answer 110 and one or more links 112 to content (here, "Ranked N Content", discussed in greater detail below). An example natural language answer 110 with and without a link 112 is shown in FIG. 2.

In some embodiments, the large language model 102 is configured to pass the user query 104 through a query rewrite 114 (also referred to as a prompt rewrite), which is used in place of the user query 104 when generating the natural language answer 110. In some embodiments, the query rewrite 114 includes a transformation of the user query 104 into a more readily searchable text. In some embodiments, the query rewrite 114 includes one or more additional search queries built from the user query 104. In some embodiments, query rewrite 114 involves modifying and/or augmenting the user query 104 to generate a new query or prompt that captures one or more aspects of the user's intent and/or facilitates a more comprehensive and accurate search result. Query rewrite 114 aims to improve the effectiveness of information retrieval by exploring different facets of the user query 104, such as by addressing synonyms, refining implicit or implied context within the user query 104, and/or accommodating known strengths and limitations of the specific large language model 102. Continuing with the previous example, the user query 104 can include the phrase "Who is John Smith and what is their work phone number?" and the query rewrite can include the phrases "search John Smith", "John Smith work contact information", "directory search for John Smith", etc.

While not meant to be particularly limited, query rewrite 114 can be implemented using one or more underlying strategies and techniques, such as using synonym expansion, entity recognition, context clarification, question transformation, parameter variation, hierarchical processing, feedback loops, and error handling. Synonym expansion involves leveraging the large language model 102 to identify synonyms and/or related terms to those found in the user query 104. In some embodiments, the query rewrite 114 includes expanding the user query 104 to include these synonyms to ensure a broader range of relevant search results. For example, a user query 104 for "climate change effects" can be transformed via query rewrite 114 to "climate change impacts", "consequences of global warming", etc. Entity recognition means the identification of specific entities, such as people, places, products, etc., mentioned in the user query 104. In some embodiments, the query rewrite 114 includes expanding the user query 104 to incorporate variations or aliases for these entities to capture more diverse search results. For example, a user query 104 for "Bill Gates Microsoft" can be transformed via query rewrite 114 to "Microsoft founder Bill Gates", "Gates' company", etc. Context clarification involves enhancing the user query 104 by adding and/or clarifying context and qualifiers that make the user's intent clearer. For example, a user query 104 for "best camera for travel" can be transformed via query rewrite 114 to "Recommendations for the best digital camera to use while traveling," "Cameras suitable for travel photography", etc. Question Transformation involves transforming a declarative statement into an interrogative form, which can be particularly useful for queries that seek opinions or recommendations. For example, a user query 104 for "Tell me about the latest smartphones" can be transformed via query rewrite 114 to "What are the latest smartphones available?", "Can you provide information on recent smartphone releases?", etc. Parameter variation, for queries involving numerical values or parameters, involves varying these parameters to explore a range of possibilities. For example, a user query 104 for "Laptops under $1000" can be transformed via query rewrite 114 to "Laptops under $800," "Best budget laptops under $1000", etc. Hierarchical processing involves breaking down relatively complex queries into multiple, simpler queries that can be processed sequentially. This approach can be useful when the user query 104 is multifaceted. For example, a user query 104 for "Books written by Stephen King and their movie adaptations" can be transformed via query rewrite 114 to "Books written by Stephen King," "Movies adapted from Stephen King's books", etc. Feedback loops involve analyzing initial search results and/or model responses (e.g., the natural language answer 110) and incorporating user feedback to refine and rewrite the user query 104. This can be an iterative process having any number of internal cycles. Error handling involves supplementing the user query 104 with one or more error-handling prompts that capture and correct common user errors and/or misunderstandings to provide more accurate search results. For example, a user query 104 for "surphace pro 9 price" can be transformed via query rewrite 114 to "What is the cost of the Surface Pro 9?," "Surface Pro 9 price", etc.

In some embodiments, the large language model 102 supplements the user query 104 (prior to or following query rewrite 114) with large language model context 116 and/or a prompt template 118 prior to generating the natural language answer 110.

The large language model context 116 represents the relatively large amount of pre-existing learned knowledge and understanding the large language model 102 acquired during the training phase and can be embedded, for example, within a knowledge graph(s). As described previously, the large language model 102 can be trained on an extensive corpus of data, including books, articles, websites, social media posts, and more. In some embodiments, the large language model context 116 includes the learned understanding of the structure, grammar, and semantics of human language, for example, an understanding of how words, phrases, and sentences are typically used in various contexts. In some embodiments, large language model context 116 includes general knowledge of the world, including various facts, concepts, historical events, geography, science, and more. In some embodiments, the large language model context 116 includes common sense reasoning abilities based on the patterns of inferences, predictions, and decisions observed within the training data used. In some embodiments, the large language model context 116 includes a vocabulary of learned lexical and semantic knowledge, including word meanings, associations, synonyms, antonyms, etc. In some embodiments, the large language model context 116 includes a learned contextual embedding based on an analysis of the previous words in a sentence and/or the surrounding text to generate responses that fit the context against which a query is made. In some embodiments, the large language model context 116 includes named entity recognition, whereby the large language model 102 can identify and understand named entities, such as people, places, organizations, dates, and more, within a query.

The prompt template 118 can be a custom-engineered prompt template that denotes a predefined structure or format for generating queries. In some embodiments, the prompt template 118 can be used by the query rewrite 114 by providing a standardized framework for systematic and consistent query generation. For example, a custom-engineered prompt template might include one or more placeholders for different potential components of the user query 104, such as keywords, parameters, qualifiers, and context. In some embodiments, the query rewrite 114 of the user query 104 includes mapping the user query 104 to the prompt template 118. In some embodiments, this mapping process involves replacing the respective placeholders in the prompt template 118 with the specific applicable (according, e.g., to the learned understanding within the large language model context 116) information found within the user query 104. In some embodiments, the prompt template 118 includes a predetermined structure to minimize hallucinations provided by the large language model 102. For example, the prompt template 118 can include instructions to only provide directly sourced answers and/or to respond accordingly if no information is found.

In some embodiments, the large language model 102 supplements the user query 104 (prior to or following query rewrite 114) with a query context 120 prior to generating the natural language answer 110. In some embodiments, the query context 120 includes the original user input (that is, the user query 104) as well as a corpus of relevant content (here, the Ranked N Content).

In some embodiments, curation of the Ranked N Content can involve a search of both public and private data sources. For example, in some embodiments, the user query 104 is provided to both a public data search API 122 and a private data search API 124. In some embodiments, the query rewrite 114 can be provided alongside the user query 104 or as a replacement for the user query 104 to both a public data search API 122 and a private data search API 124 (this configuration not separately shown). In some embodiments, the user query 104 and/or query rewrite 114 are provided to one or both of the public data search API 122 and the private data search API 124 using the large language model 102. For example, the large language model 102 can be trained to generate API inputs to the respective public data search API 122 and the private data search API 124 to cause those respective APIs to initiate a search for documents.

In some embodiments, the public data search API 122 includes one or more public search indices that can be queried using the user query 104 to find one or more public documents 126 that contain keyword(s) and/or context related to (via, for example, semantic similarity) the user query 104. As used herein, the term "document" does not strictly refer solely to actual documents, but to any type of retrievable data source, such as a web page, a web page link, literal documents, files, etc. Moreover, as used herein, the term "public document" means a publicly retrievable data source, such as a published web page on the Internet that can be indexed within a public search index and/or that can be navigated to using a web browser. Observe that, because the public documents 126 are sourced from publicly-available information, the scope and/or content of the public documents 126 will be the same for all users.

In some embodiments, the private data search API 124 includes one or more private search indices that can be queried using the user query 104 to find one or more private documents 128 that contain keyword(s) and/or context related to the user query 104. The term "private document" means any data source that is not intended to be publicly retrievable. In an example, a private document can include a company datasheet that is gated behind an authentication process, although other private documents and data are within the contemplated scope of this disclosure. The term "private search index" (or private search indices) refers to a search index built on private documents (in contrast to a public search index, which is built on public documents such as an Internet web page).

In some embodiments, the private data search API 124 is configured to communicate and/or otherwise receive user credentials 130 from an authentication server 132 prior to executing a private search for the private documents 128. In some embodiments, the client 106 provides the credentials 130 to the authentication server 132. In some embodiments, the credentials 130 are provided prior to generating the user query 104, such as during a system login and/or authentication process. Alternatively, or in addition, the credentials 130 can be provided alongside the user query 104 to allow for a supplemental search of private data accessible using the credentials 130 when answering the user query 104. In some embodiments, the private data search API 124 includes a list of authorized users for one or more of the private search indices. In some embodiments, each of the private search indices is associated with a respective list of authorized users. In this manner, the private data search API 124 can leverage, for a particular user query 104, any private search index for which the respective user is authorized to access. Observe that, because the private documents 128 are sourced according to the credentials 130, the scope and/or content of the private documents 128 will vary from user to user (that is, according to the respective credentials 130 of the client 106).

In some embodiments, a content fetch 134 is configured to retrieve the Top N Content from the public documents 126 and the private documents 128. In some embodiments, N is a predetermined threshold number of content (e.g., 1, 2, 10, 50, etc.) to retain, although other configurations, such as dynamically determining N based on the amount public documents 126 and private documents 128 returned (e.g., retrain top 1, 3, 5, 10, 20, 50, etc. percent) and/or dynamically determining N based on a relevancy cutoff according to the search indices (e.g., retrain all documents having a relevancy score of 70, 80, 90, 95, 98, etc. percent), are within the contemplated scope of this disclosure.

In some embodiments, the Top N Content from the content fetch 134 is ordered via a ranking 136. In some embodiments, ranking 136 can build an ordered list (index, ranking, etc.) of a plurality of web pages and documents (collectively, the public documents 126 and/or the private documents 128) returned by the public data search API 122 and the private data search API 124. For example, in some embodiments, Ranked N Content can be built from the Top N Content by sorting the Top N Content in order of their relative ranking (for example, their indexed position, their semantic similarity to the user query 104, etc.) within their respective public and private search indices.

As described previously, in some embodiments, the response 108 provided to the client 106 includes a combination of a natural language answer 110 and one or more links 112 to one or more documents of the Ranked N Content. In some embodiments, links 112 are provided for one or more of the public documents 126 and private documents 128. In some embodiments, links 112 are provided for one or more documents used to answer the user query 104. For example, consider that a response 108 to the user query 104 for "Who is John Smith and what is their work phone number" might include the natural language answer 110 "John Smith is a Software Developer that can be reached at 555-555-1234." Consider further that the retrieved phone number was source from a workplace directory (one of the private documents 128). In some embodiments, links 112 are provided for the workplace directory, as that directory was used to answer at least a portion of the user query 104.

In some embodiments, the Ranked N Content is also provided alongside the user query 104 as a query context 120 for the large language model 102. In some embodiments, the query context 120 includes extracted full contents and/or summary information for any of the public documents 126 and/or private documents 128.

FIG. 2 depicts an example SERP 200 of an intelligent chat system in accordance with one or more embodiments of the present invention. The SERP 200 can be presented to a user (e.g., the client 106 in FIG. 1) in a user interface of a computer system (e.g., the computer system 300 in FIG. 3). In some embodiments, the SERP 200 can be presented to a user in response to receiving, from the user, a query (e.g., the user query 104 in FIG. 1). In some embodiments, the user provides the user query 104 via a chat interface 202 and/or search bar of a search engine, which can itself define part of the user interface. As shown in FIG. 2, the user query 104 contains the text: "Who is John Smith and what is their work phone number?".

As described previously, current search solutions build a response to the user query 104 from publicly-accessible information. An example public-limited response 204 having a natural language answer 110 is shown on the left side of FIG. 2. In this case, the identity of "John Smith" might refer to any of a number of individuals (sourced, e.g., via a social media platform such as LinkedIn) and a few such options are provided to the user. Unfortunately, the public data does not include work numbers for these individuals and the message merely directs the user to find and investigate their company directories for that information.

An example hybrid response 206 having a natural language answer 110 and one or more links 112 is shown on the right side of FIG. 2. In contrast to the public-limited response 204, the hybrid response 206 leverages both public and private data sources when building the natural language answer 110. In this case, the identity of "John Smith" can be determined from context, for example, using the known current employer of the user making the user query 104. In particular, by leveraging this context, a large language model (e.g., the large language model 102 of FIG. 1) can infer that "John Smith" most likely refers to the John Smith at the user's same company (here, "YOUR COMPANY"). Moreover, because the user is also an employee at the same company, the private Company Directory can be accessed using the user's credentials and the work phone number for John Smith can be provided. As further shown in FIG. 2, a link 112 to the company directory can be provided alongside the natural language answer 110 for easy verification. In some embodiments, the hybrid response 206 also includes one or more hyperlinks 208 to information of interest, such as, for example, a hyperlink to a text interface for sending a message to John Smith and/or a phone interface for initiating a phone call with John Smith. Observe that leveraging public and private data in the hybrid response 206 results in a much richer and more complete response than offered using the public-limited response 204 alone.

In some embodiments, the hybrid response 206 (the natural language answer 110 and/or the one or more links 112) can be constructed to visually distinguish between information obtained from public data sources (e.g., via the public data search API 122) and information obtained from private data sources (e.g., via the private data search API 124). For example, John Smith's work number, text link, phone link, and company directory can be displayed in bold to differentiate over the publicly-available information (as shown). Of course, the use of bold typeface on private data is merely illustrative, and any means of visually distinguishing public data from private data is within the contemplated scope of this disclosure. For example, the font color, font size, background color (highlighting), etc. can be modified and various circles, arrows, etc. can be wholly or partially overlayed over the text to provide a visual basis for distinguishing between public and private information.

Figure 3:
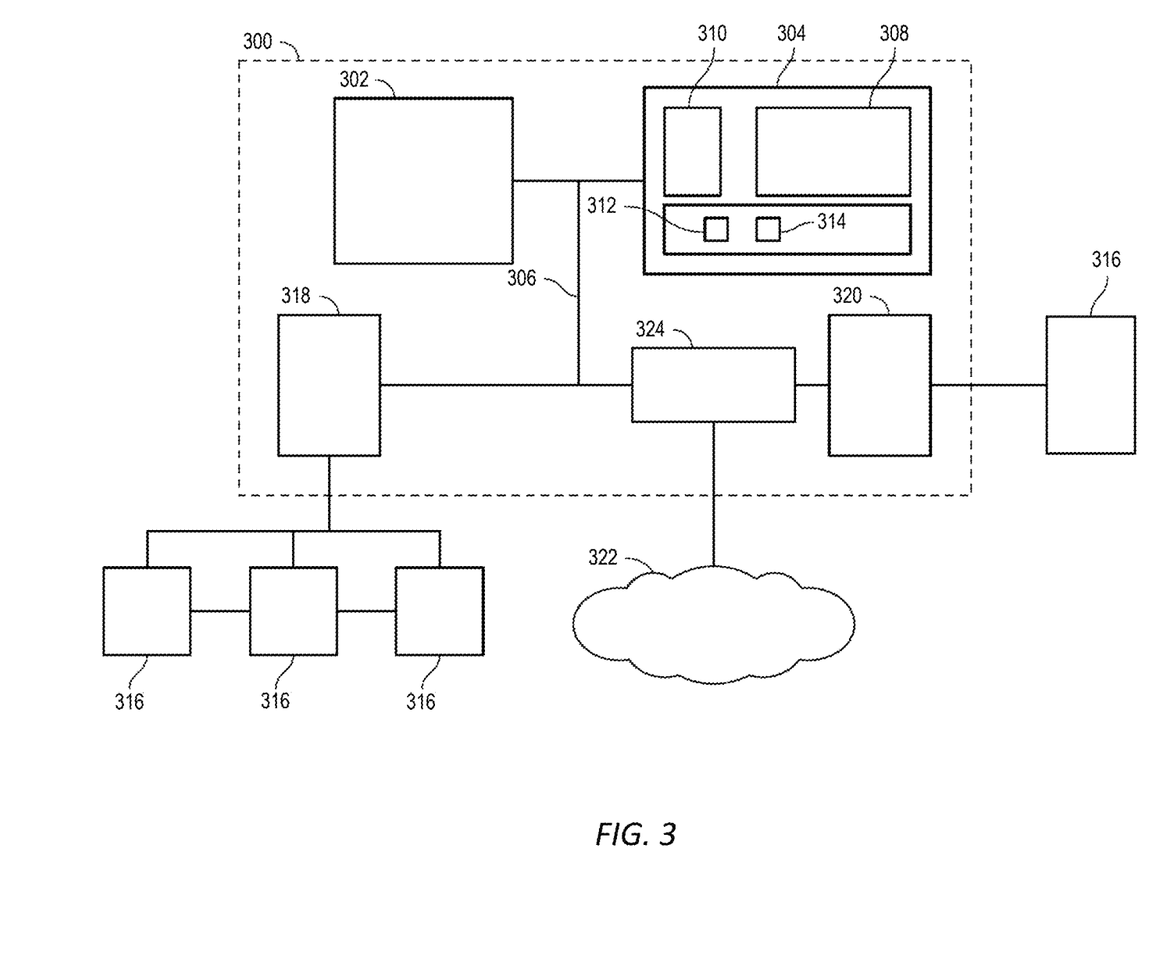
FIG. 3 depicts a block diagram of a computer system according to one or more embodiments.

FIG. 3 illustrates aspects of an embodiment of a computer system 300 that can perform various aspects of embodiments described herein. In some embodiments, the computer system(s) 300 can implement and/or otherwise be incorporated within or in combination with the intelligent chat system and/or large language model 102 described with respect to FIGS. 1 and 2. In some embodiments, a computer system 300 can be implemented server-side. For example, a remote computer system 300 can be configured to receive a query (e.g., a user query 104) from a user (e.g., the client 106) and to respond with an answer (e.g., the response 108 including a natural language answer 110 and one or more links 112).

The computer system 300 includes at least one processing device 302, which generally includes one or more processors or processing units for performing a variety of functions, such as, for example, completing any portion of the block diagrams 100, 200, 300, and 400 described previously herein. Components of the computer system 300 also include a system memory 304, and a bus 306 that couples various system components including the system memory 304 to the processing device 302. The system memory 304 may include a variety of computer system readable media. Such media can be any available media that is accessible by the processing device 302, and includes both volatile and non-volatile media, and removable and non-removable media. For example, the system memory 304 includes a non-volatile memory 308 such as a hard drive, and may also include a volatile memory 310, such as random access memory (RAM) and/or cache memory. The computer system 300 can further include other removable/non-removable, volatile/non-volatile computer system storage media.

The system memory 304 can include at least one program product having a set (e.g., at least one) of program modules that are configured to carry out functions of the embodiments described herein. For example, the system memory 304 stores various program modules that generally carry out the functions and/or methodologies of embodiments described herein. A module or modules 312, 314 may be included to perform functions related to the block diagrams 100, 200, 300, and 400 as described previously herein. The computer system 300 is not so limited, as other modules may be included depending on the desired functionality of the computer system 300. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 302 can also be configured to communicate with one or more external devices 316 such as, for example, a keyboard, a pointing device, and/or any devices (e.g., a network card, a modem, etc.) that enable the processing device 302 to communicate with one or more other computing devices. Communication with various devices can occur via Input/Output (I/O) interfaces 318 and 320.

The processing device 302 may also communicate with one or more networks 322 such as a local area network (LAN), a general wide area network (WAN), a bus network and/or a public network (e.g., the Internet) via a network adapter 324. In some embodiments, the network adapter 324 is or includes an optical network adaptor for communication over an optical network. It should be understood that although not shown, other hardware and/or software components may be used in conjunction with the computer system 300. Examples include, but are not limited to, microcode, device drivers, redundant processing units, external disk drive arrays, RAID systems, and data archival storage systems, etc.

Figure 4:
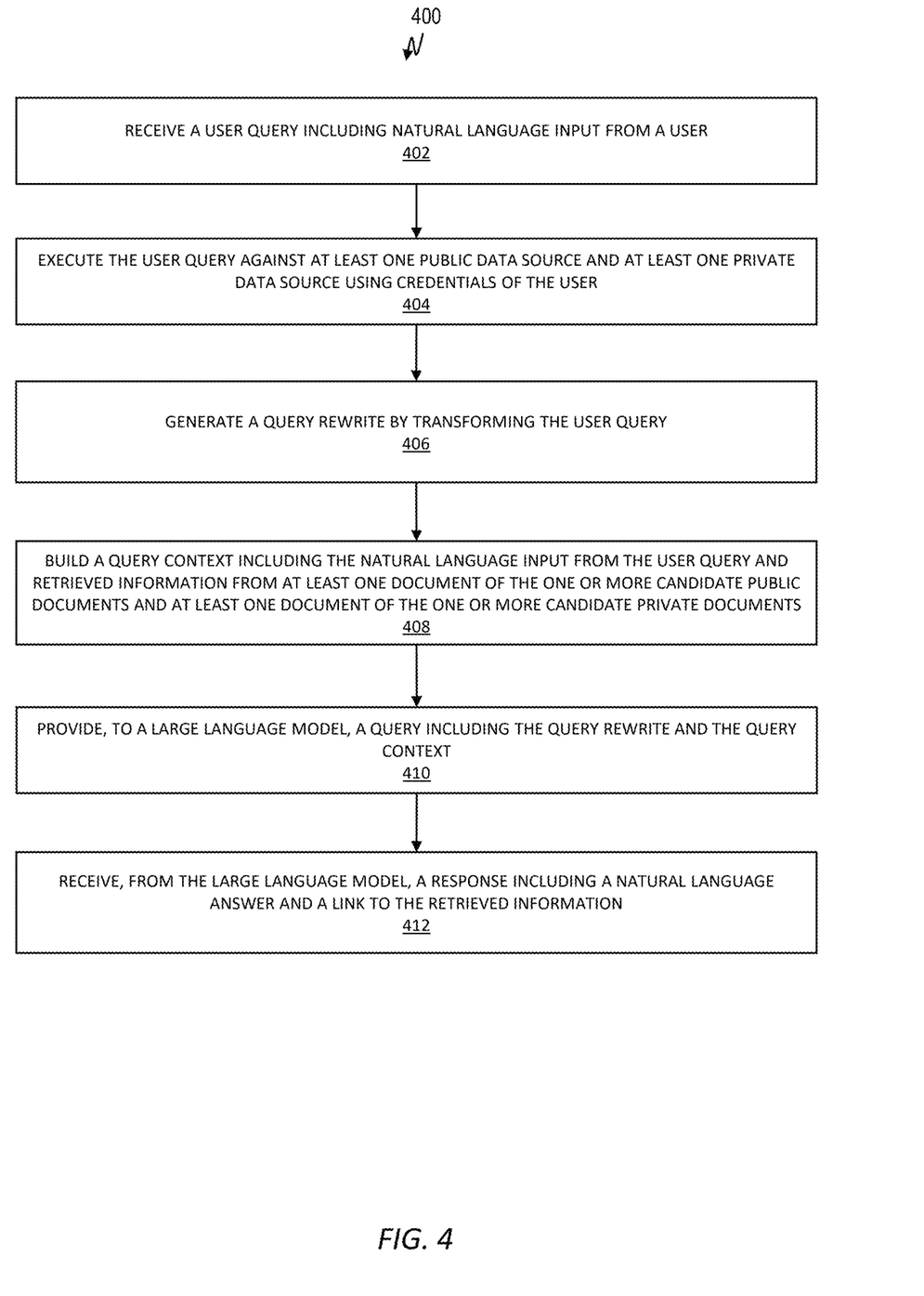
FIG. 4 depicts a flowchart of a method for an intelligent chat system in accordance with one or more embodiments.

Referring now to FIG. 4, a flowchart 400 for providing an intelligent chat is generally shown according to an embodiment. The flowchart 400 is described with reference to FIGS. 1 to 3 and may include additional steps not depicted in FIG. 4. Although depicted in a particular order, the blocks depicted in FIG. 4 can be, in some embodiments, rearranged, subdivided, and/or combined.

At block 402, the method includes receiving a user query that includes natural language input from a user.

At block 404, the method includes executing the user query against at least one public data source and at least one private data source. In some embodiments, the user query is executed using a large language model (e.g., large language model 102). In some embodiments, for queries executed against a public data source, one or more candidate public documents are retrieved using one or more available public search indices. In some embodiments, for queries executed against a private data source, one or more candidate private documents are retrieved using credentials of the user.

In some embodiments, retrieving one or more candidate private documents includes identifying, using the credentials of the user, a list of authorized private search indices for the user. In some embodiments, the credentials of the user can be checked against predetermined permissions data stored and/or otherwise associated with each respective private search index. In some embodiments, retrieving one or more candidate private documents further includes executing the user query against one or more private search indices within the list of authorized private search indices for the user. In some embodiments, retrieving one or more candidate private documents further includes retrieving one or more candidate private documents using only the list of authorized private search indices.

In some embodiments, retrieving respective candidate private documents and respective candidate public documents from the public data source(s) and private data source(s) includes caching, during or after indexing (that is, building the respective public search index or private search index), a copy of all or a portion of the respective document. In some embodiments, the cached copy of the respective document is mapped and/or otherwise associated to the respective index in which the document can be found. In some embodiments, retrieving respective candidate private documents and respective candidate public documents includes fetching the cached copy of the respective document (or portion thereof) identified within the respective index. In other words, indexing can include building a list of links to respective documents as well as caching and/or otherwise storing metadata and content data for those respective documents that can be retrieved using the respective search index.

At block 406, the method includes generating a query rewrite by transforming the user query. In some embodiments, the query rewrite is generated using a large language model (e.g., large language model 102). In some embodiments, transforming the user query includes using at least one of synonym expansion, entity recognition, context clarification, question transformation, parameter variation, hierarchical processing, feedback loops, and error handling.

At block 408, the method includes building a query context including the natural language input from the user query and retrieved information from at least one document of the one or more candidate public documents and at least one document of the one or more candidate private documents. In some embodiments, the query context is built using a large language model (e.g., large language model 102).

At block 410, the method includes providing, to a large language model, a query including the query rewrite and the query context. In some embodiments, providing the query includes structuring the query to differentiate between the user query and the retrieved information.

At block 412, the method includes receiving, from the large language model, a response including a natural language answer and a link to the retrieved information. In some embodiments, the response visually distinguishes between information obtained from the public data source and information obtained from the private data source.

In some embodiments, the method includes selecting a subset of the candidate public documents and candidate private documents having a highest semantic similarity to the user query for including within the query context. In some embodiments, semantic similarity is determined according to a distance measure including at least one of a cosine distance, Jaccard similarity, Euclidean distance, Manhattan distance, Minkowski distance, Mahalanobis distance, and Pearson's correlation coefficient.

In some embodiments, the method includes ranking the selected subset of the candidate public documents and candidate private documents. In some embodiments, ranking the selected subset includes sorting the selected subset of the candidate public documents and candidate private documents in order of their respective rankings within their respective search indices.

While the disclosure has been described with reference to various embodiments, it will be understood by those skilled in the art that changes may be made and equivalents may be substituted for elements thereof without departing from its scope. The various tasks and process steps described herein can be incorporated into a more comprehensive procedure or process having additional steps or functionality not described in detail herein. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

Unless defined otherwise, technical and scientific terms used herein have the same meaning as is commonly understood by one of skill in the art to which this disclosure belongs.

Various embodiments of the invention are described herein with reference to the related drawings. The drawings depicted herein are illustrative. There can be many variations to the diagrams and/or the steps (or operations) described therein without departing from the spirit of the disclosure. For instance, the actions can be performed in a differing order or actions can be added, deleted or modified. All of these variations are considered a part of the present disclosure.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. The term "or" means "and/or" unless clearly indicated otherwise by context.

The terms "received from", "receiving from", "passed to", "passing to", etc. describe a communication path between two elements and does not imply a direct connection between the elements with no intervening elements/connections therebetween unless specified. A respective communication path can be a direct or indirect communication path.

The corresponding structures, materials, acts, and equivalents of all means or step plus function elements in the claims below are intended to include any structure, material, or act for performing the function in combination with other claimed elements as specifically claimed.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

Various embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments described herein have been presented for purposes of illustration, but are not intended to be exhaustive or limited to the form(s) disclosed. The embodiments were chosen and described in order to best explain the principles of the disclosure. Many modifications and variations will be apparent to those of ordinary skill in the art without departing from the scope and spirit of the described embodiments. The terminology used herein was chosen to best explain the principles of the various embodiments, the practical application or technical improvement over technologies found in the marketplace, or to enable others of ordinary skill in the art to understand the embodiments described herein.

What is claimed is:

1. A method comprising:
   receiving a user query comprising natural language input from a user;
   executing the user query against at least one public data source and at least one private data source, wherein the executing comprises:
   for queries executed against a public data source, retrieving one or more candidate public documents using one or more available public search indices; and
   for queries executed against a private data source, retrieving one or more candidate private documents using credentials of the user;
   generating a query rewrite by transforming the user query;
   building a query context comprising the natural language input from the user query and retrieved information from at least one document of the one or more candidate public documents and at least one document of the one or more candidate private documents;

providing, to a large language model, a query comprising the query rewrite and the query context; and receiving, from the large language model, a response comprising a natural language answer.

2. The method of claim 1, wherein transforming the user query comprises using at least one of synonym expansion, entity recognition, context clarification, question transformation, parameter variation, hierarchical processing, feedback loops, and error handling.

3. The method of claim 1, wherein retrieving one or more candidate private documents comprises:

identifying, using the credentials of the user, a list of authorized private search indices for the user; and executing the user query against one or more private search indices within the list of authorized private search indices for the user.

4. The method of claim 3, wherein retrieving one or more candidate private documents further comprises retrieving one or more candidate private documents using only the list of authorized private search indices.

5. The method of claim 1, further comprising selecting a subset of the candidate public documents and candidate private documents having a highest semantic similarity to the user query.

6. The method of claim 5, wherein the response further comprises a link to the retrieved information.

7. The method of claim 5, further comprising ranking the selected subset of the candidate public documents and candidate private documents.

8. The method of claim 7, wherein ranking the selected subset comprises sorting the selected subset of the candidate public documents and candidate private documents in order of their respective rankings within their respective search indices.

9. The method of claim 1, wherein providing the query comprises structuring the query to differentiate between the user query and the retrieved information.

10. The method of claim 1, wherein the response visually distinguishes between information obtained from the public data source and information obtained from the private data source.

11. A system having a memory, computer readable instructions, and one or more processors for executing the computer readable instructions, the computer readable instructions controlling the one or more processors to perform operations comprising:

receiving, at a large language model, a query context comprising retrieved information from at least one document of one or more candidate public documents and one or more candidate private documents;

generating, by the large language model, a query rewrite by transforming a user query comprising natural language input; and generating, by the large language model, a response to the user query, the response comprising a natural language answer.

12. The system of claim 11, wherein generating the query rewrite comprises mapping the user query to a prompt template.

13. The system of claim 12, wherein the prompt template comprises instructions to the large language model to limit the response to directly sourced answers or to respond accordingly if no information is found.

14. The system of claim 12, wherein the prompt template distinguishes between the user query and the retrieved information.

15. The system of claim 11, wherein the response further comprises a link to the retrieved information.

16. The system of claim 15, wherein directing the user device to the retrieved information comprises providing a cached version of the retrieved information to the user device.

17. A system having a memory, computer readable instructions, and one or more processors for executing the computer readable instructions, the computer readable instructions controlling the one or more processors to perform operations comprising:

receiving, from a client by a large language model, a user query comprising natural language input from a user and credentials of the user;

executing, by the large language model, the user query against at least one public data source using one or more public search indices to identify a public document;

executing, by the large language model, the user query against at least one private data source using the credentials of the user to access the at least one private data source to identify a private document; and providing, by the large language model to the client, a response comprising a natural language answer to the user query that leverages at least one of the public document and the private document.

18. The system of claim 17, wherein the response further comprises a link to at least one of the public document and the private document.

19. The system of claim 18, further comprising directing the client to the private document responsive to receiving a selection of the link.

20. The system of claim 18, further comprising providing a copy of the private document to the client responsive to receiving a selection of the link.

* * * * *